US008687136B2

(12) United States Patent
Huang et al.

(10) Patent No.: US 8,687,136 B2
(45) Date of Patent: Apr. 1, 2014

(54) REPAIRING METHOD FOR PIXEL STRUCTURE WITH REPAIRABLE CAPACITOR STRUCTURES

(75) Inventors: Wei-Kai Huang, Tainan (TW); Yi-Jen Chen, Tainan (TW); Tzu-Chieh Lai, Jhonghe (TW); Chiung-Pin Wang, Changhua (TW)

(73) Assignee: Au Optronics Corporation, Hsinchu (TW)

( * ) Notice: Subject to any disclaimer, the term of this patent is extended or adjusted under 35 U.S.C. 154(b) by 72 days.

(21) Appl. No.: 13/437,381

(22) Filed: Apr. 2, 2012

(65) Prior Publication Data

US 2012/0190265 A1 Jul. 26, 2012

Related U.S. Application Data

(62) Division of application No. 11/160,821, filed on Jul. 12, 2005, now Pat. No. 8,169,561.

(30) Foreign Application Priority Data

Apr. 19, 2005 (TW) .............................. 94112345 A

(51) Int. Cl.
*G02F 1/1343* (2006.01)
*G02F 1/1333* (2006.01)

(52) U.S. Cl.
USPC .................... 349/54; 349/38; 349/39; 349/55

(58) Field of Classification Search
USPC .......................................... 349/38–39, 54–55
See application file for complete search history.

(56) References Cited

U.S. PATENT DOCUMENTS

| 5,321,535 | A  | 6/1994  | Ukai et al. |
|-----------|----|---------|-------------|
| 6,462,792 | B1 | 10/2002 | Ban et al. |
| 6,724,443 | B1 | 4/2004  | Sano et al. |
| 2001/0046003 | A1 | 11/2001 | Song |
| 2001/0052889 | A1 | 12/2001 | Fukunishi |
| 2002/0054248 | A1 | 5/2002  | Cheng et al. |
| 2002/0140896 | A1 | 10/2002 | Lee |
| 2003/0038917 | A1 | 2/2003  | Song et al. |
| 2003/0080339 | A1 | 5/2003  | Wu et al. |
| 2003/0080368 | A1 | 5/2003  | Wu et al. |
| 2004/0001176 | A1 | 1/2004  | Kim et al. |
| 2004/0084751 | A1 | 5/2004  | Stern |
| 2004/0183983 | A1 | 9/2004  | Shih et al. |
| 2005/0046763 | A1 | 3/2005  | Ono et al. |
| 2005/0259190 | A1 | 11/2005 | Wang et al. |

FOREIGN PATENT DOCUMENTS

| CN | 1570745   | 1/2005  |
| JP | 06-130415 | 5/1994  |
| JP | 07-270824 | 10/1995 |
| JP | 11-007046 | 1/1999  |
| TW | 516225    | 1/2003  |
| TW | 516239    | 1/2003  |

*Primary Examiner* — Lauren Nguyen
(74) *Attorney, Agent, or Firm* — McClure, Qualey & Rodack, LLP

(57) ABSTRACT

A repairing method for a pixel structure including an active device, a pixel electrode connected with the active device, a bottom electrode disposed under the pixel electrode, upper electrodes disposed between the pixel electrode and the bottom electrode and connected with the pixel electrode, a first dielectric layer disposed between the bottom electrode and the upper electrodes and a second dielectric layer disposed between the upper electrodes and the pixel electrode is provided. The repairing method includes removing a portion of the pixel electrode to electrically isolate the contact region over the upper electrode from the remaining portion of the pixel electrode, wherein a storage capacitor is formed by the reserved region over the upper electrode, the second dielectric layer and the remaining portion of the pixel electrode.

6 Claims, 10 Drawing Sheets

REPAIRING METHOD FOR PIXEL STRUCTURE WITH REPAIRABLE CAPACITOR STRUCTURES

CROSS-REFERENCE TO RELATED APPLICATION

This is a divisional application of patent application Ser. No. 11/160,821 filed on Jul. 12, 2005, now allowed. The prior application Ser. No. 11/160,821 claims the benefit of Taiwan Patent Application No. 94112345 filed on Apr. 19, 2005, the disclosures of which are incorporated herein by reference in their entirety.

BACKGROUND OF THE INVENTION

1. Field of the Invention

The present invention relates to a pixel structure and a repairing method thereof, and particularly to a pixel structure and a repairing method thereof by which slight bright dots can be avoided.

2. Description of Related Art

Cathode Ray Tube (CRT) displays have long dominated the display market, although having the disadvantages of bulkiness, radiation contamination, and energy consumption and not being able to satisfy the demands of the consumers for a slimmer display consuming less power. Therefore, Thin Film Transistor-Liquid Crystal Displays (TFT-LCD), having the advantages of higher image quality, better space efficiency, lower power consumption, and zero radiation, have gradually become a mainstream product of the display market.

A TFT-LCD mainly comprises a TFT array substrate, a color filter array substrate and liquid crystal layers, wherein the TFT array substrate comprises a plurality of pixel structures arranged in an array, each pixel structure comprises a TFT, a pixel electrode and a storage capacitor. Such a pixel structure may become a dot defect when an abnormal leakage of the storage capacitor occurs due to particles or broken dielectric layers of the storage capacitor. Some laser repairing technologies have been developed for repairing such dot defects, such as the disclosure in TW Patent Application No. 516225.

FIG. 1 is a schematic diagram for illustrating a feed through voltage (Vft) respectively of a normal pixel structure and an abnormal pixel structure. Referring to FIG. 1, the feed through voltage $Vft=Cgd \cdot (Vgh-Vgl)/(Cst+CLC+Cgd)$, wherein the Cgd is the parasitic capacitance of the gate electrode and the drain electrode of a TFT; Vgh is the threathold voltage of the gate electrode; Vgl is the turning-off voltage of the gate electrode; Cst is the storage capacitance of the pixel structure; and CLC is the liquid crystal capacitance. It can be known from the above equation that the value of the feed through voltages will become larger or smaller when the storage capacitance in a repaired pixel structure becomes smaller or larger. Note that although most conventional laser repairing technologies can be used for repairing abnormal pixel structures, the storage capacitances Cst of the repaired pixel structures are often different from the storage capacitances of the normal pixel structures. Therefore, there will be differences between the feed through voltages of the repaired pixel structures and the normal pixel structures, such that the repaired pixel structures become slight bright dots.

SUMMARY OF THE INVENTION

The present invention is directed to provide a pixel structure, in which the difference of feed through voltage before and after repairing is insignificant, for efficiently avoiding slight bright dots.

The present invention is directed to provide a repairing method for repairing a dot defect caused by a short circuit between an upper electrode and a bottom electrode.

The present invention is directed to provide a repairing method for repairing a dot defect caused by a short circuit between an upper electrode and a bottom electrode or a short circuit of an upper electrode with the an electrode and a pixel electrode at the same time.

The present invention is directed to provide a repairing method for repairing a dot defect caused by a short circuit between an upper electrode and a data line.

The present invention is directed to provide a repairing method for repairing a dot defect caused by a short circuit between upper electrodes of pixel structures adjacent to each other due to conductor residue.

The present invention provides a pixel structure electrically connecting with a scan line and a data line. The pixel structure includes an active device, a pixel electrode, a bottom electrode, a plurality of upper electrodes, a first dielectric layer and a second dielectric layer. The pixel electrode is electrically connected with the active device; the bottom electrode is disposed under the pixel electrode; the upper electrodes is disposed between the pixel electrode and the bottom electrode and electrically connected with the pixel electrode. It should be noted that the total area of the upper electrode overlapping with the bottom electrode is A, and the overlapping portion of the pixel electrode with each upper electrode includes a contact region and a reserved region, wherein the total area of the reserved region is B. Furthermore, the first dielectric layer is at least disposed between the bottom electrode and the upper electrodes, and the second dielectric layer is at least disposed between the upper electrodes and the pixel electrode, wherein the dielectric constant of the first dielectric layer is $\epsilon 1'$ the thickness of the first dielectric layer is d1; the dielectric constant of the second dielectric layer is $\epsilon 2'$ the thickness of the second dielectric layer is d2' and $0.5<(\epsilon 1 \cdot d2 \cdot A)/(\epsilon 2 \cdot d1 \cdot B)<1.5$. In an embodiment of the present invention, the value of $(\epsilon 1 \cdot d2 \cdot A)/(\epsilon 2 \cdot d1 \cdot B)$ is between 0.7 and 1.3. In an alternative embodiment of the present invention, the value of $(\epsilon 1 \cdot d2 \cdot A)/(\epsilon 2 \cdot d1 \cdot B)$ is equal to 1.

In an embodiment of the present invention, the pixel electrodes have a plurality of gaps located between the corresponding contact regions and the reserved regions.

In an embodiment of the present invention, the second dielectric layers have a plurality of contact windows for exposing a portion area of the corresponding upper electrodes, and the pixel electrode is electrically connected with the upper electrodes via the contact windows.

In an embodiment of the present invention, for example, the upper electrodes are E1, E2 . . . EN, the overlapping areas of the upper electrodes E1, E2 . . . EN with the bottom electrode are respectively A1, A2 . . . AN, while the areas of the reserved regions corresponding to the upper electrodes E1, E2 . . . EN are respectively B1, B2 . . . BN, wherein $0.5<(\epsilon 1 \cdot d2 \cdot Ax)/(\epsilon 2 \cdot d1 \cdot Bx)<1.5'$ and $x=1, 2 \ldots N-1$ or N. For example, the value of $(\epsilon 1 \cdot d2 \cdot Ax)/(\epsilon 2 \cdot d1 \cdot Bx)$ is between 0.7 and 1.3. In an embodiment of the present invention, the value of $(\epsilon 1 \cdot d2 \cdot Ax)/(\epsilon 2 \cdot d1 \cdot Bx)$ is equal to 1. In an alternative embodiment of the present invention, $A1=A2= \ldots =AN$, and $B1=B2= \ldots =BN$.

In an embodiment of the present invention, the quantity of the upper electrodes is two, each of which having an overlapping area with the bottom electrode of respectively A1 and A2, the areas of the reserved regions corresponding to each of the upper electrodes being respectively B1 and B2, wherein $0.5<(\epsilon 1 \cdot d2 \cdot A1)/(\epsilon 2 \cdot d1 \cdot B2)<1.5$, and $0.5<(\epsilon 1 \cdot d2 \cdot A2)/(\epsilon 2 \cdot d1 \cdot B1)<1.5$. For example, the value of $(\epsilon 1 \cdot d2 \cdot A1)/$ ($\epsilon_2 \cdot d_1 \cdot B_2$) is between 0.7 and 1.3. In an embodiment of the present invention, the value of ($\epsilon_1 \cdot d_2 \cdot A_1$)/($\epsilon_2 \cdot d_1 \cdot B_2$) is equal to 1. In an alternative embodiment of the present invention, A1=A2 and B1=B2.

A repairing method for repairing the foregoing pixel structures is provided. As a short circuit occurs between an upper electrode E1 and the bottom electrode, the repairing method includes: removing the pixel electrode to electrically isolate the contact region over the upper electrode E1 from the remaining portion of the pixel electrode, wherein a storage capacitor is formed by the reserved region over the upper electrode E1, the second dielectric layer and the upper electrode E1. Furthermore, in an embodiment of the present invention, the repairing method further includes a step of welding the upper electrode E1, the contact region over the upper electrode E1 and the bottom electrode.

A repairing method for repairing the foregoing pixel structures is provided. As a short circuit occurs between the bottom electrode and the pixel electrode or between an upper electrode E1 and the bottom electrode and the pixel electrode at the same time, the repairing method includes: removing the pixel electrode to electrically isolate the contact region over the upper electrode E1, the reserved region over the upper electrode E1 and the reserved region over an upper electrode E2 from the remaining portion of the pixel electrode, wherein a storage capacitor is formed by the reserved region over the upper electrode E2, the second dielectric layer and the upper electrode E2. Furthermore, in an embodiment of the present invention, the repairing method further includes a step of welding the upper electrode E1, the reserved region over the upper electrode E1 and the bottom electrode.

A repairing method for repairing the foregoing pixel structures is provided. As a short circuit occurs between an upper electrode E1 and the data line, the repairing method includes: removing the pixel electrode to electrically isolate the contact region over the upper electrode E1, the reserved region over the upper electrode E1 and the reserved region over the upper electrode E2, from the remaining portion of the pixel electrode, wherein a storage capacitor is formed by the reserved region over the upper electrode E2, the second dielectric layer and the upper electrode E2; then welding the pixel electrode with the bottom electrode.

A repairing method for repairing the foregoing pixel structures is provided. As a short circuit occurs between the upper electrode E1 and an upper electrode of one of its adjacent pixel structures due to conductor residue, the repairing method includes the steps of: first, removing the pixel electrode to electrically isolate the contact region over the upper electrode E1 from the remaining portion of the pixel electrode; then, welding the upper electrode E1, the contact region over the upper electrode E1 with the bottom electrode, wherein a storage capacitor is formed by the reserved region over the upper electrode E1, the second dielectric layer and the upper electrode E1.

Under the circumstances of abnormal short circuits, the present invented pixel structures can be repaired, and the feed through voltages of the repaired pixel structures varies insignificantly from the feed through voltages of the normal pixel structures, by which the problem of slight bright dots can be avoided effectively.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Pixel Structure

Figure 1:
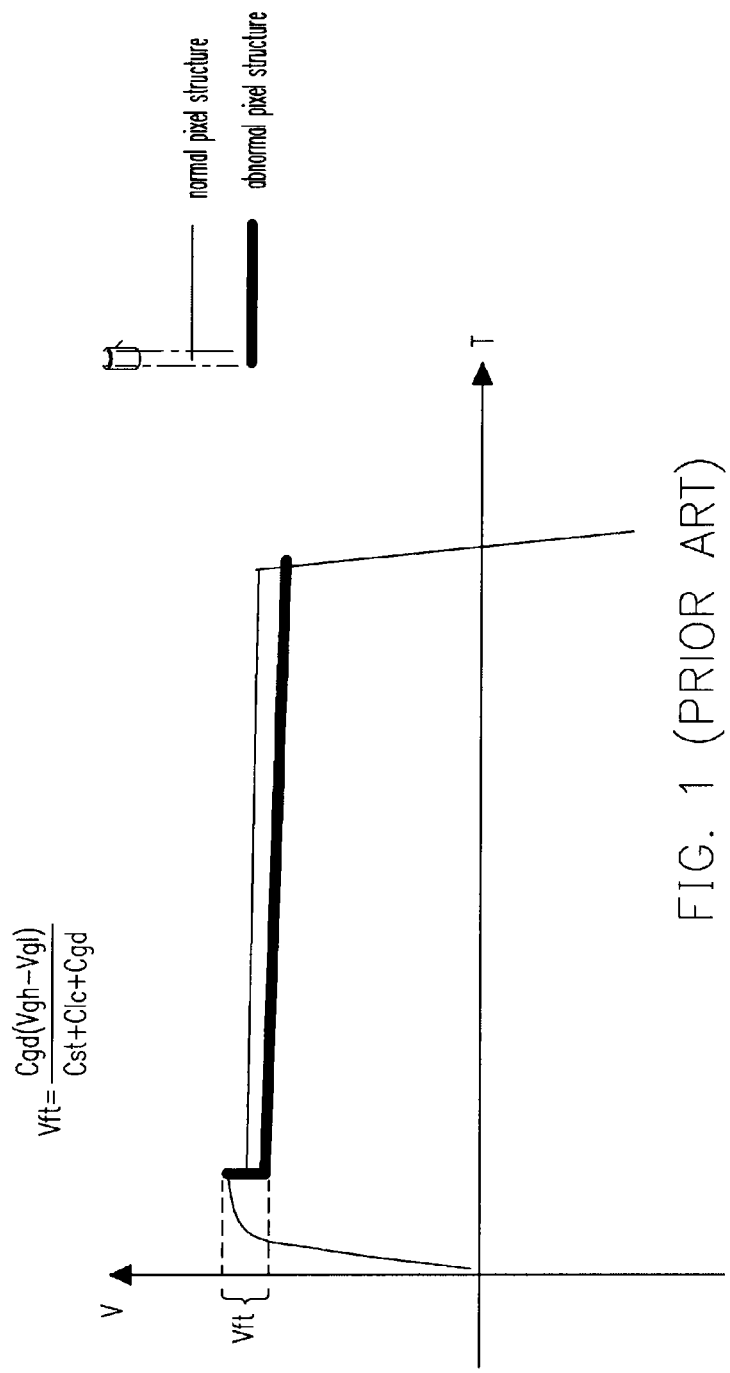
FIG. 1 is a schematic diagram for illustrating the feed through voltages (Vft) respectively of a normal pixel structure and an abnormal pixel structure.
Figure 2A:
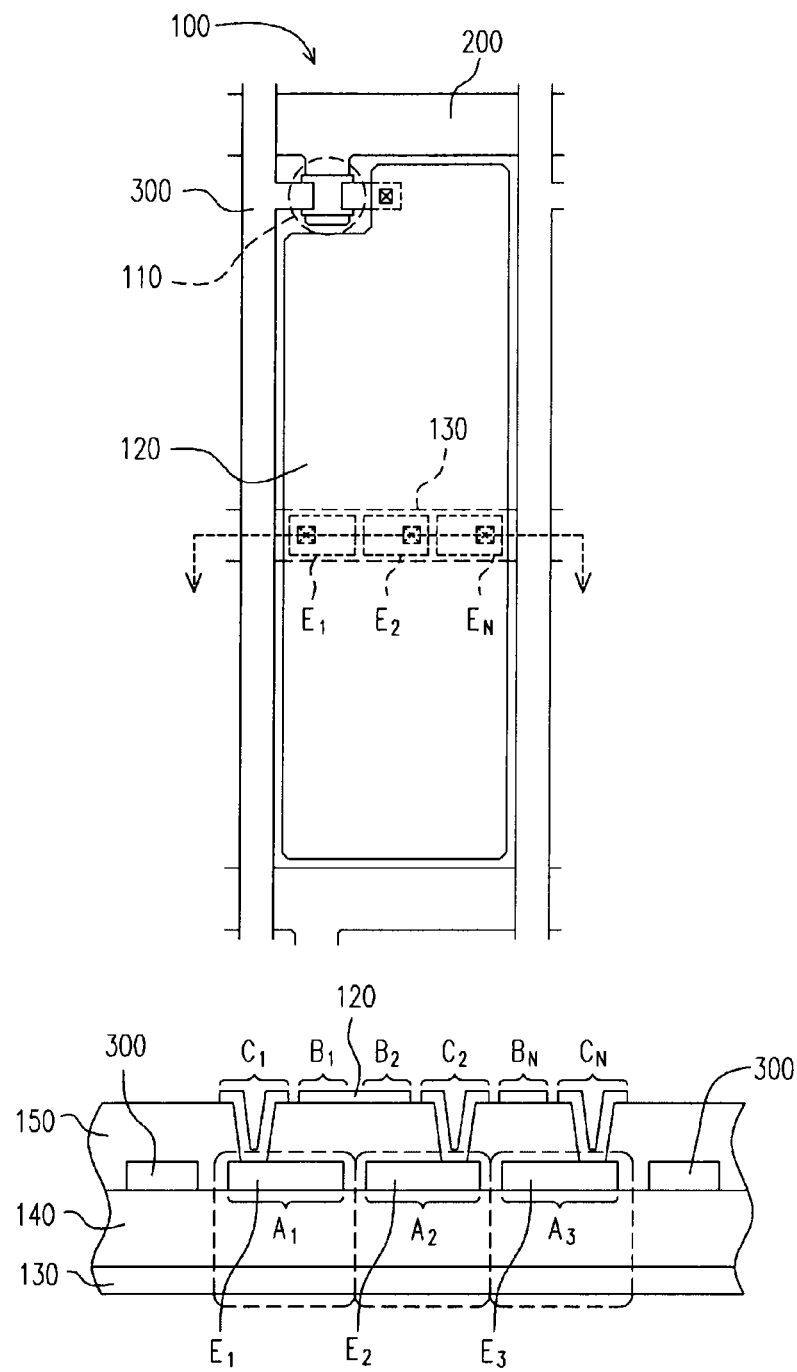
FIG. 2A is a schematic diagram of a pixel structure according to an embodiment of the present invention.

FIG. 2A is a schematic diagram of a pixel structure according to an embodiment of the present invention. Referring to FIG. 2A, a pixel structure 100 of an embodiment of the present invention is adapted for electrically connecting with a scan line 200 and a data line 300. It can be seen from FIG. 2A that the pixel structure 100 includes an active device 110, a pixel electrode 120, a bottom electrode 130, a plurality of upper electrodes E1, E2 . . . EN, a first dielectric layer 140 and a second dielectric layer 150. The pixel electrode 120 is electrically connected with the active device 110. The bottom electrode 130 is disposed under the pixel electrode 120. The upper electrodes E1, E2 . . . EN are disposed between the pixel electrode 120 and the bottom electrode 130 and electrically connected with the pixel electrode 120.

Figure 2B:
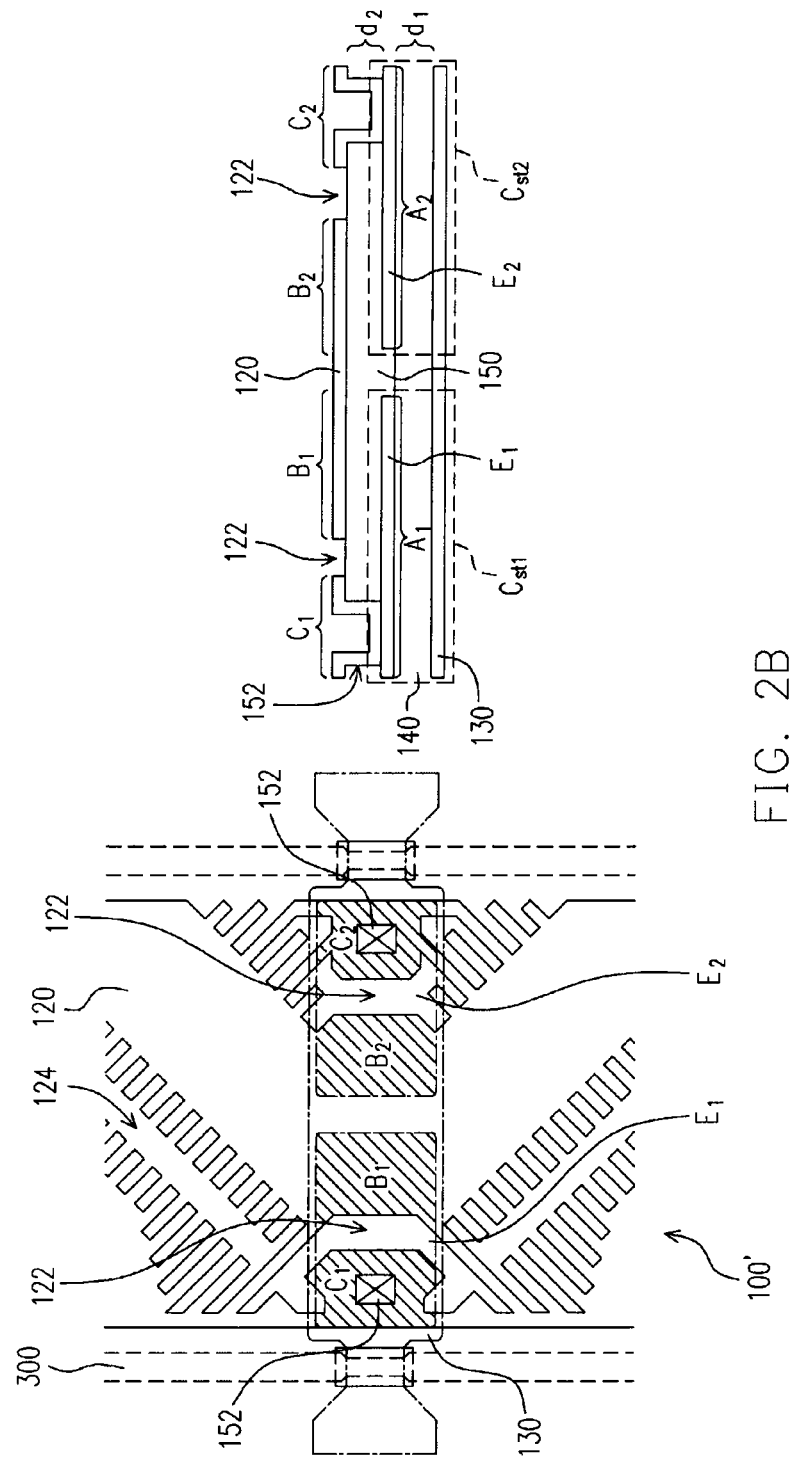
FIG. 2B is a schematic diagram of a pixel structure according to another embodiment of the present invention.

FIG. 2B is a schematic diagram of a pixel structure according to another embodiment of the present invention. For an easy illustration, referring to FIG. 2B, a pixel structure 100' having two upper electrodes E1 and E2 is given as an example according to the present invention. It should be noted that for achieving similar or better effects, all characteristics described in FIG. 2B can be used in the pixel structure 100 of FIG. 2A.

Referring to FIGS. 2A and 2B, the overlapping areas of the upper electrodes E1, E2 (or upper electrodes E1, E2 . . . EN) with the bottom electrode 130 are respectively A1, A2 (or A1, A2 . . . AN), and the total area of the overlapping areas A1, A2 (or A1, A2 . . . AN) is A. The overlapping areas of the upper electrodes E1, E2 (or upper electrodes E1, E2 . . . EN) with the pixel electrode 120 include a plurality of contact regions C1, C2 (or contact regions C1, C2 . . . CN) and a plurality of reserved regions B1, B2 (or reserved regions B1, B2 . . . BN), and the total area of the reserved regions B1, B2 (or reserved regions B1, B2 . . . BN) is B. Furthermore, the first dielectric layer 140 is at least disposed between the bottom electrode 130 and the upper electrodes E1, E2 (or upper electrodes E1, E2 . . . EN); the second dielectric layer 150 is at least disposed between the upper electrodes E1, E2 (or upper electrodes E1, E2 . . . EN) and the pixel electrode 120. According to the present embodiment, the dielectric constant of the first dielectric layer 140 is $\epsilon 1'$ the thickness of the first dielectric layer 140 is d1; the dielectric constant of the second dielectric layer 150 is $\epsilon 2'$ the thickness of the second dielectric layer 150 is d2' wherein $0.5<(\epsilon 1 \cdot d2 \cdot A)/(\epsilon 2 \cdot d1 \cdot B)<1.5$. In an alternative embodiment, the value of $(\epsilon 1 \cdot d2 \cdot A)/(\epsilon 2 \cdot d1 \cdot B)$ is between 0.7 and 1.3.

It is to be noted that the pixel electrode 120 may have a plurality of gaps 122 located between the corresponding contact regions C1, C2 and reserved regions B1, B2. For example, in a multi-domain vertical alignment LCD (MVA-LCD), the gaps 122 of the pixel electrode 120 can be integrated with slits 124. Also, the second dielectric layer 150 of the embodiment may have a plurality of contact windows 152 for exposing a portion area of the corresponding upper electrodes E1, E2, and the pixel electrode 120 is electrically connected with the upper electrodes E1, E2 via the contact windows 152 respectively.

When a pixel structure 100 or a pixel structure 100' is under a condition of $0.5<(\epsilon 1 \cdot d2 \cdot A)/(\epsilon 2 \cdot d1 \cdot B)<1.5$, the differences between the feed through voltage of repaired pixel structure 100 or a pixel structure 100' and the feed through voltage of a normal pixel structure can be controlled within a certain range, such that slight bright dots are not likely to occur. According to an embodiment of the present invention, the pixel structure 100 or the pixel structure 100' is designed for matching the condition of $(\epsilon 1 \cdot d2 \cdot A)/(\epsilon 2 \cdot d1 \cdot B)=1$, wherein the feed through voltages of the pixel structure 100 or the pixel structure 100' is almost equal to the feed through voltages of a normal pixel structure such that the slight bright dots can be avoided effectively.

According to another embodiment of the present invention, the pixel structure 100 or the pixel structure 100' is designed for matching the condition of $0.5<(\epsilon 1 \cdot d2 \cdot Ax)/(\epsilon 2 \cdot d1 \cdot Bx)<1.5'$ wherein x=1, 2 ... N−1 or N. Also, the pixel structure 100 or the pixel structure 100' can be designed for matching the condition of $0.7<(\epsilon 1 \cdot d2 \cdot Ax)/(\epsilon 2 \cdot d1 \cdot Bx)<1.3$ or even the condition of $(\epsilon 1 \cdot d2 \cdot Ax)/(\epsilon 2 \cdot d1 \cdot Bx)=1$. Referring to the pixel structure 100' of FIG. 2B as an example, it can be designed for matching the condition of $0.5<(\epsilon 1 \cdot d2 \cdot A1)/(\epsilon 2 \cdot d1 \cdot B2)<1.5$, and $0.5<(\epsilon 1 \cdot d2 \cdot A2)/(\epsilon 2 \cdot d1 \cdot B1)<1.5$ or even the condition of $0.7<(\epsilon 1 \cdot d2 \cdot A1)/(\epsilon 2 \cdot d1 \cdot B2)<1.3$. In a preferred embodiment of the present invention, the pixel structure 100 or the pixel structure 100' can be designed for matching the condition of $(\epsilon 1 \cdot d2 \cdot A1)/(\epsilon 2 \cdot d1 \cdot B2)=(\epsilon 1 \cdot d2 \cdot A2)/(\epsilon 2 \cdot d1 \cdot B1)=1$. Also, according to one aspect of the present invention, the pixel structure 100 or the pixel structure 100' can be designed for matching the condition of A1=A2 and B1=B2 (or A1= A2= ... =AN and B1=B2= ... =BN) for enhancing the adaptability of the pixel structures 100, 100' for repair.

The principle of the present invention for avoiding the slight bright dots and the repairing procedures of the foregoing pixel structures under different conditions are to be disclosed as below.

Repairing Method

Figure 3A:
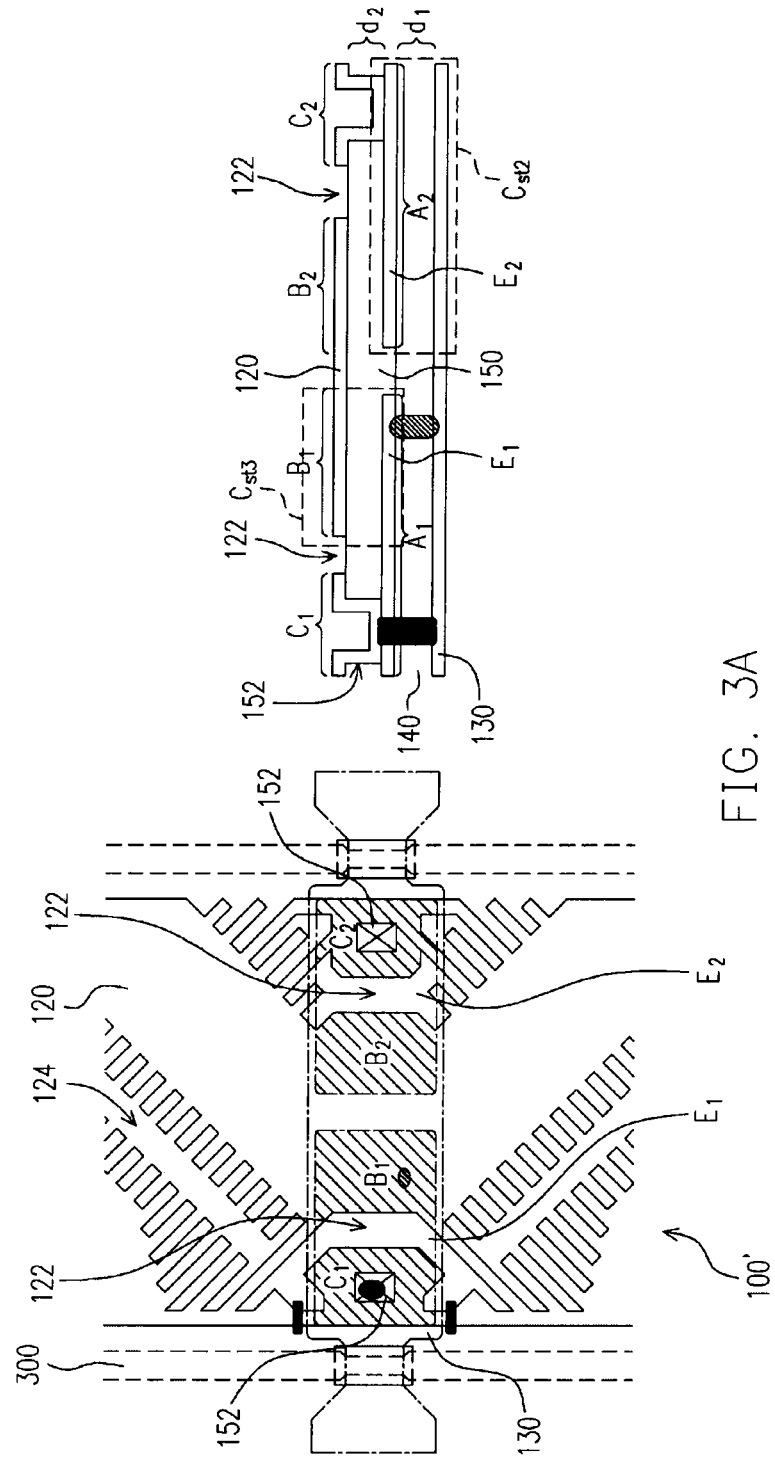
FIGS. 3A and 3B are schematic diagrams for illustrating the pixel structure shown in FIG. 2 repaired after a short circuit between an upper electrode and the bottom electrode.
Figure 3B:
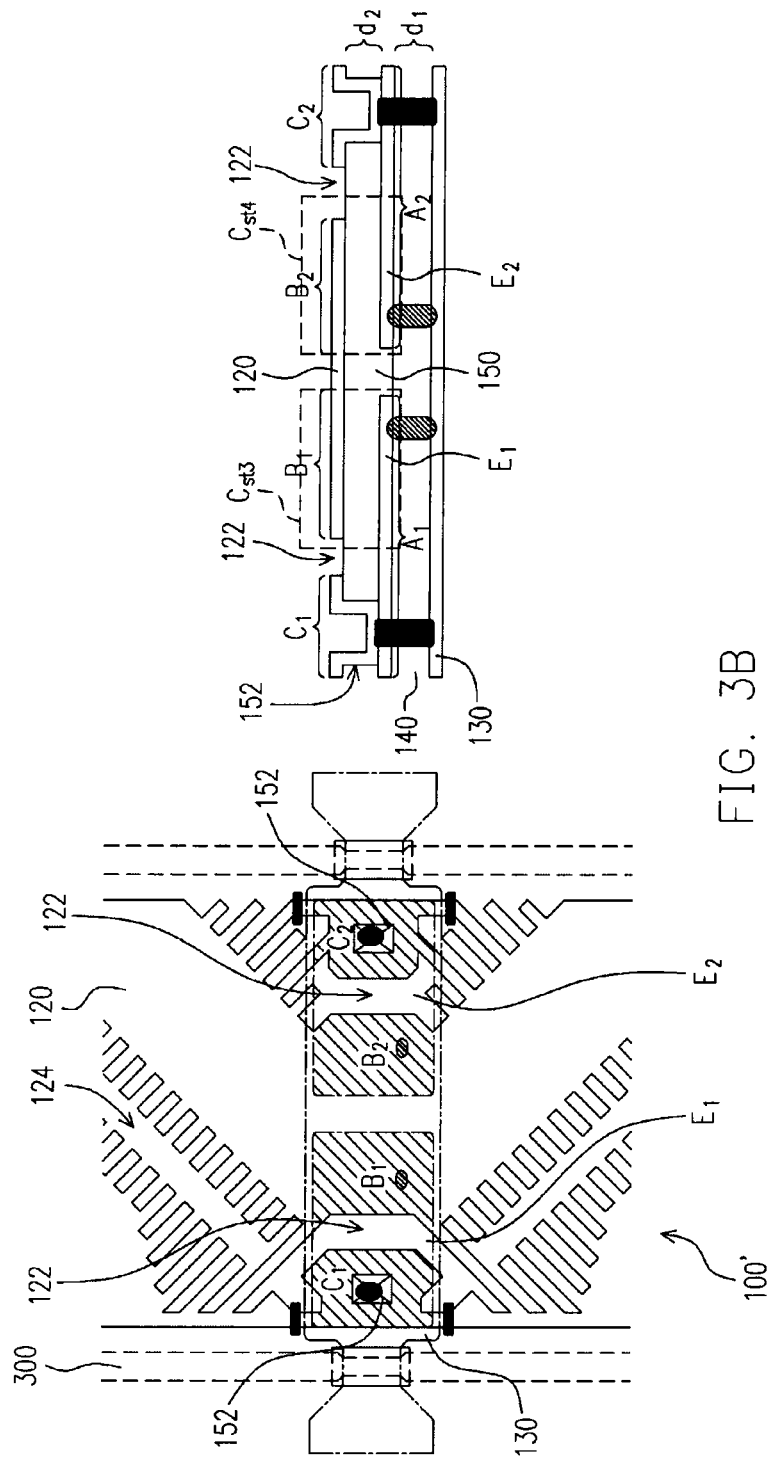

FIGS. 3A and 3B are schematic diagrams for illustrating the pixel structure shown in FIG. 2 repaired after a short circuit between an upper electrode and the bottom electrode. Referring to FIG. 3A, a short circuit between an upper electrode E1 and the bottom electrode 130 may occur generally due to a particle or a broken first dielectric layer 140, during the manufacturing process of pixel structures. According to an embodiment of the present invention, when a short circuit occurs between an upper electrode E1 and the bottom electrode 130, a laser cutting process is performed to remove a part of pixel electrode 120 to electrically isolate a contact region C1 over the upper electrode E1 from the remaining portion of the pixel electrode 120. After the foregoing laser cutting process, a storage capacitor Cst3 is substantially formed by a reserved region B1 over the upper electrode E1, the second dielectric layer 140 and the upper electrode E1. Further, for enhancing the charging/discharging characteristic of the storage capacitor Cst3, a laser welding process may be further performed to weld the upper electrode E1, the contact region C1 over the upper electrode E1 and the bottom electrode 130, according to an embodiment of the present invention.

Referring to FIGS. 2B and 3B, in a pixel structure 100' of FIG. 2B, the capacitance CA1 of the storage capacitor Cst1 is equal to $(\epsilon 1 \cdot A1/d1)$. In a pixel structure 100' of FIG. 3B, the capacitance CA3 of the storage capacitor Cst3 is equal to $(\epsilon 2 \cdot B1/d2)$. It should be noted that because of $CA1/CA3=(\epsilon 1 \cdot d2 \cdot A1)/(\epsilon 2 \cdot d1 \cdot B1)$, and according to an design principle of an embodiment of the present invention in which the pixel structure should match the condition of $0.5<(\epsilon 1 \cdot d2 \cdot A1)/(\epsilon 2 \cdot d1 \cdot B1)<1.5$, the value of CA1/CA3 can be controlled within the range from 0.5 to 1.5, or even about 1. Therefore, the pixel structure 100' would not likely become a slight bright dot after being repaired because the value of CA1/CA3 is controlled within such a reasonable range.

Referring to FIG. 3B, if a short circuit occurs between the upper electrodes E1 and E2 and the bottom electrode 130 at the same time, a repairing procedure similar with that of FIG. 3A can be adopted for forming a storage capacitor Cst4 to replace the foregoing storage capacitor Cst2. In a pixel structure 100' of FIG. 2B, the capacitance CA2 of the storage capacitor Cst2 is equal to $(\epsilon 1 \cdot A2/d1)$. In a pixel structure 100' of FIG. 3B, the capacitance CA4 of the storage capacitor Cst4 is equal to $(\epsilon 2 \cdot B2/d2)$. It should be noted that because of $CA2/CA4=(\epsilon 1 \cdot d2 \cdot A2)/(\epsilon 2 \cdot d1 \cdot B2)$, and according to an design principle of an embodiment of the present invention in which the pixel structure should match the condition of $0.5<(\epsilon 1 \cdot d2 \cdot A2)/(\epsilon 2 \cdot d1 \cdot B2)<1.5$, the value of CA2/CA4 can be controlled within the range from 0.5 to 1.5. Therefore, the pixel structure 100' would not likely become a slight bright dot defect after being repaired because the value of CA2/CA4 is controlled within such a reasonable range.

Figure 4A:
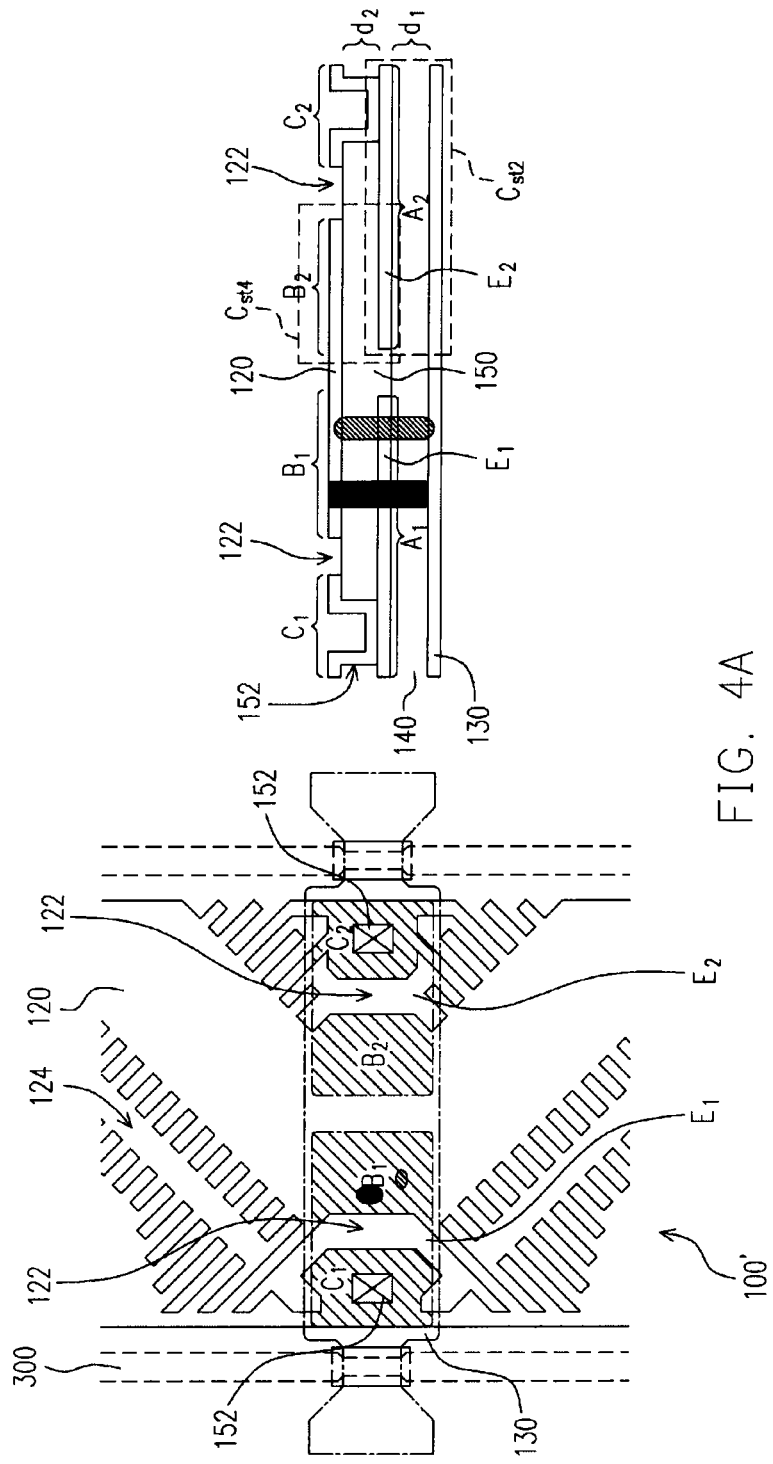
FIG. 4A is a schematic diagram for illustrating the pixel structure shown in FIG. 2 repaired after a short circuit of an upper electrode E1 with the bottom electrode and the pixel electrode at the same time.
Figure 4B:
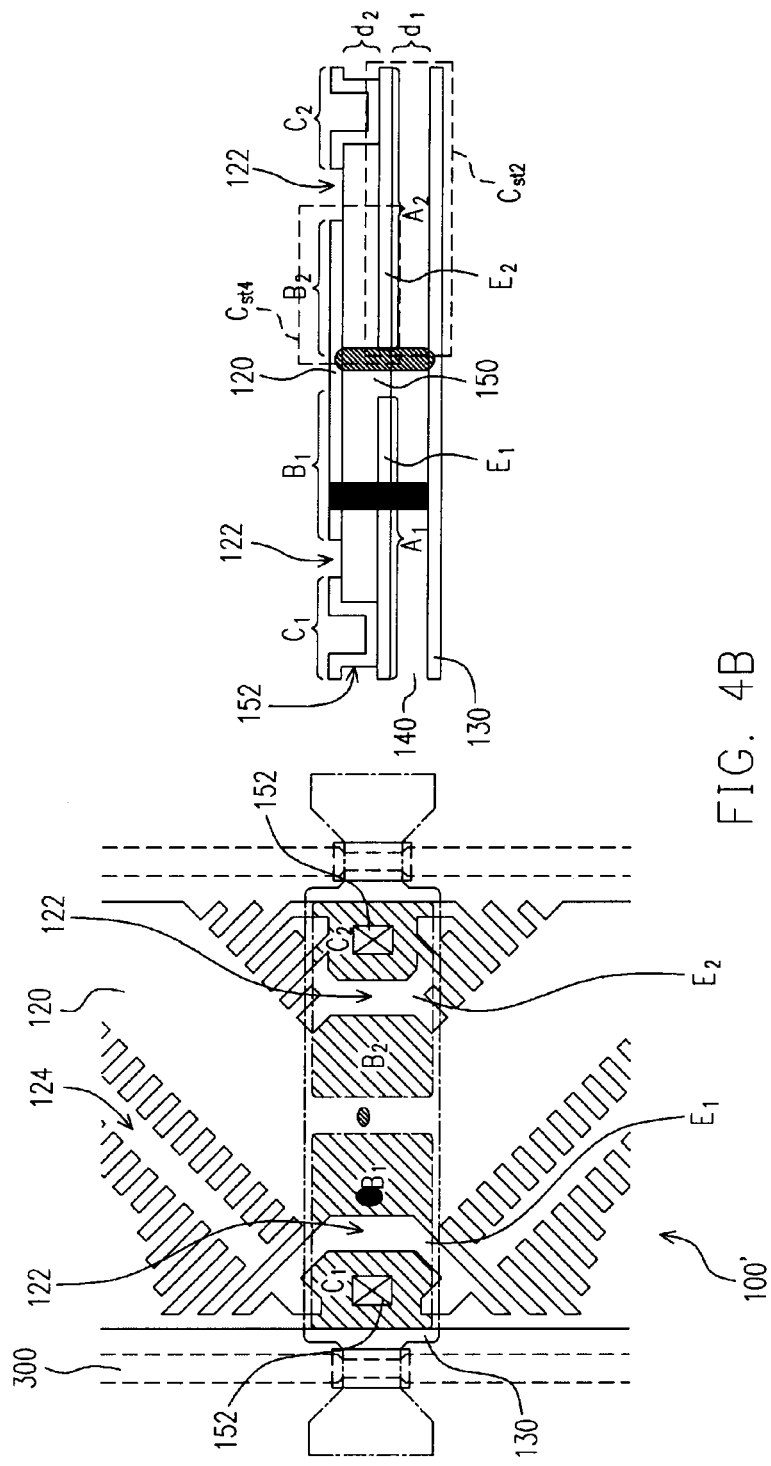
FIG. 4B is a schematic diagram for illustrating the pixel structure shown in FIG. 2 repaired after a short circuit of the bottom electrode with the pixel electrode.

FIG. 4A is a schematic diagram for illustrating the pixel structure shown in FIG. 2 repaired after a short circuit of an upper electrode E1 with the bottom electrode and the pixel electrode at the same time, and FIG. 4B is a schematic diagram for illustrating the pixel structure shown in FIG. 2 repaired after a short circuit of the bottom electrode with the pixel electrode. Referring to FIGS. 4A and 4B, according to an embodiment of the present invention, when a short circuit occurs between the bottom electrode 130 with the pixel electrode 120 or between an upper electrode E1 with both the bottom electrode 130 and the pixel electrode 120, a laser cutting process is performed to remove a part of pixel electrode 120 to electrically isolate a contact region C1 over the upper electrode E1, a reserved region B1 over the upper electrode E1 and a reserved region B2 over the upper electrode E2 from the remaining portion of the pixel electrode 120. After the foregoing laser cutting process, a storage capacitor Cst4 is substantially formed by a reserved region B2 over the upper electrode E2, the second dielectric layer 140 and the upper electrode E2. Further, for enhancing the charging/discharging characteristic of the storage capacitor Cst4, a laser welding process may be further performed to weld the upper electrode E1, the reserved region B1 over the upper electrode E1 and the bottom electrode 130, according to an embodiment of the present invention.

In the pixel structure 100' of FIG. 2B, the capacitance CA1 of the storage capacitor Cst1 is equal to $(\epsilon 1 \cdot A1/d1)$. In the pixel structure 100' of FIG. 4A, the capacitance CA4 of the storage capacitor Cst4 is equal to ($\epsilon 2 \cdot B2/d2$). It should be noted that because of CA1/CA4=($\epsilon 1 \cdot d2 \cdot A1$)/($\epsilon 2 \cdot d1 \cdot B2$), and according to an design principle of an embodiment of the present invention in which the pixel structure should match the conditions of $0.5<(\epsilon 1 \cdot d2 \cdot A1)/(\epsilon 2 \cdot d1 \cdot B1)<1.5$ and A1=A2 (or B1=B2), the value of CA1/CA4 can be controlled within the range from 0.5 to 1.5. Therefore, the pixel structure 100' would not likely become a slight bright dot defect after being repaired because the value of CA1/CA3 is controlled within such a reasonable range.

Figure 5A:
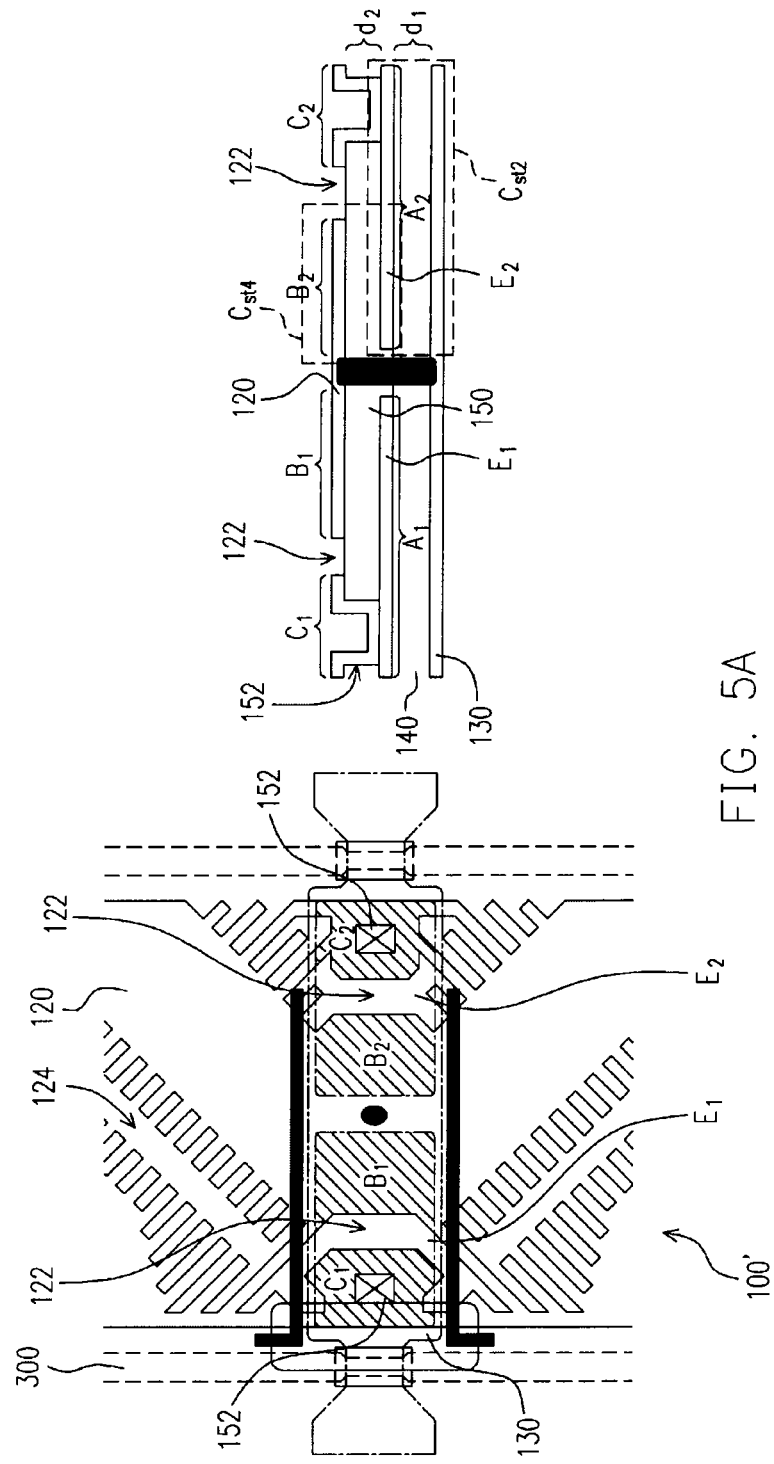
FIGS. 5A and 5B are schematic diagrams for illustrating the pixel structure shown in FIG. 2 repaired after a short circuit between an upper electrode and a data line.
Figure 5B:
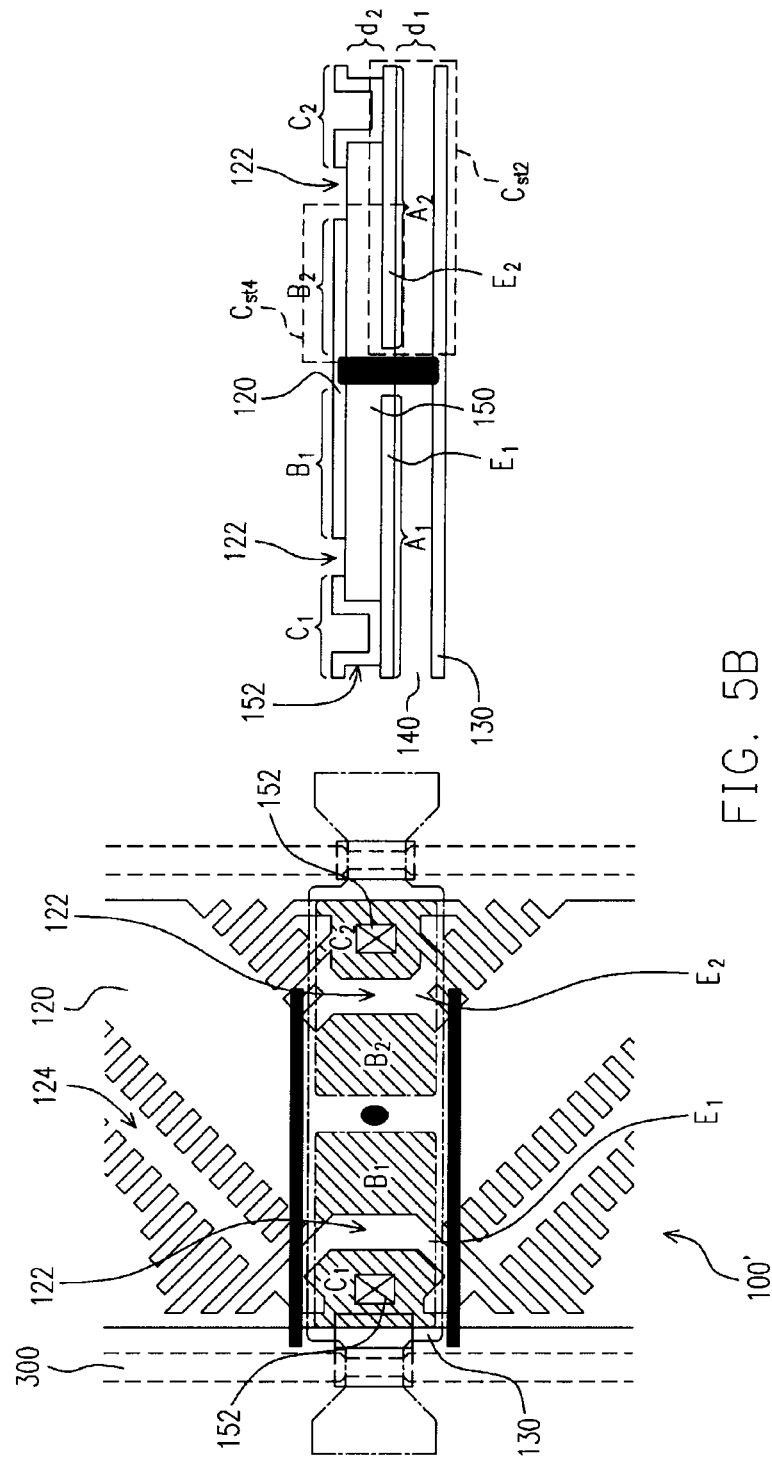

FIGS. 5A and 5B are schematic diagrams for illustrating the pixel structure shown in FIG. 2 repaired after a short circuit between an upper electrode and a data line. Referring to FIGS. 5A and 5B, during the manufacturing process of pixel structures, a short circuit between an upper electrode E1 and a data line 300 may occur due to metal residue or amorphous silicon residue. According to an embodiment of the present invention, when a short circuit between an upper electrode E1 and a data line 300, a laser cutting process can be performed to remove a part of pixel electrode 120 to electrically isolate a contact region C1 over the upper electrode E1, a reserved region B1 over the upper electrode E1 and a reserved region B2 over the upper electrode E2 from the remaining portion of the pixel electrode 120. After the foregoing laser cutting process, a laser welding process may be further performed to weld the pixel electrode 120 and the bottom electrode 130, for forming a storage capacitor Cst4 comprising the reserved region B2 over the upper electrode E2, the second dielectric layer 150 and the upper electrode E2.

Figure 6:
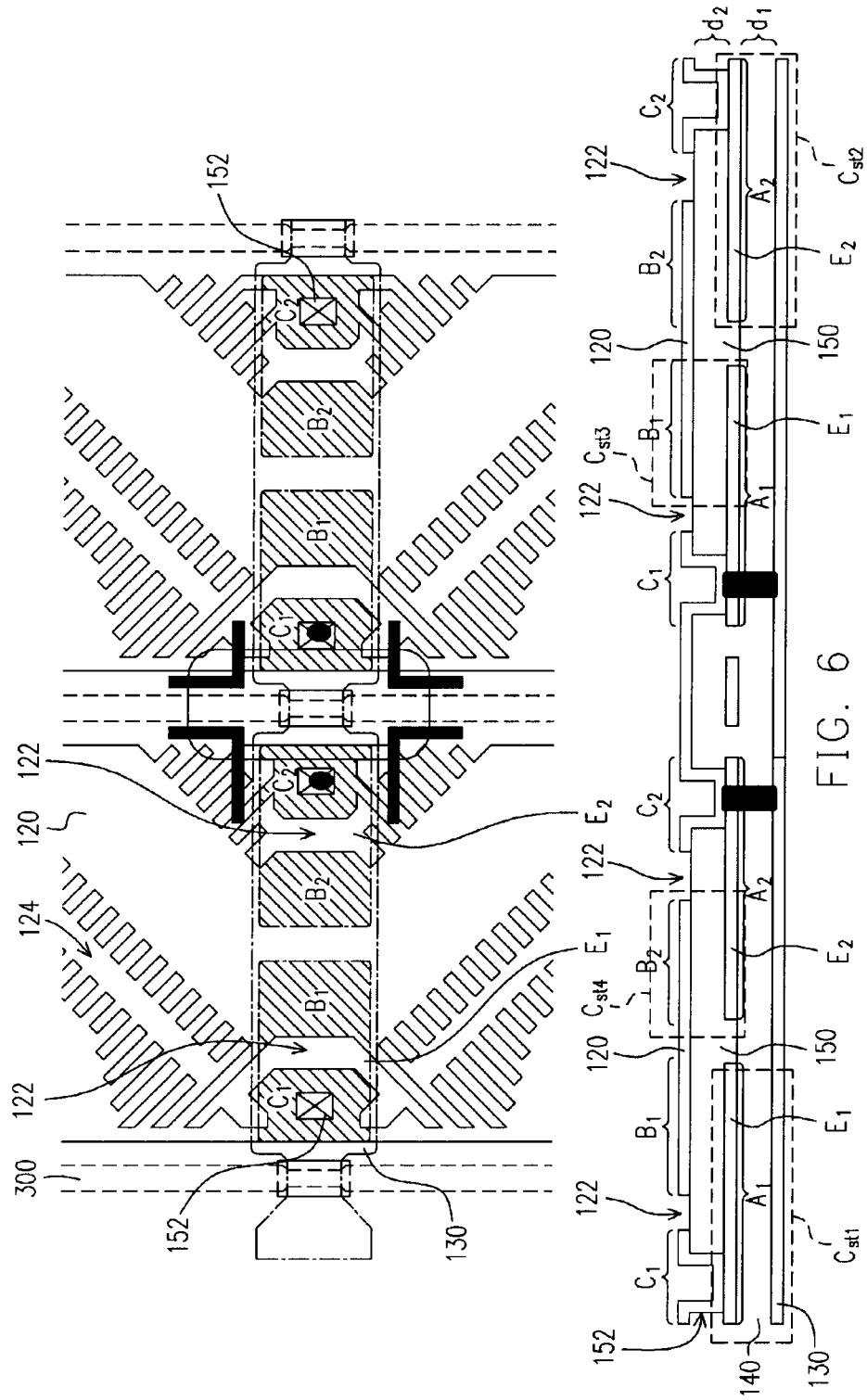
FIG. 6 is a schematic diagram for illustrating the pixel structure shown in FIG. 2 repaired to overcome the conductor residue.

FIG. 6 is a schematic diagram for illustrating the pixel structure shown in FIG. 2 repaired for overcoming the conductor residue. Referring to FIG. 6, during the manufacturing process of pixel structures, a short circuit between an upper electrode E1 and an upper electrode of an adjacent pixel structure may occur due to Indium Tin Oxide (ITO) residue or other residue of materials for fabricating pixel electrodes. According to an embodiment of the present invention, when a short circuit occurs between an upper electrode E1 with another upper electrode of an adjacent pixel structure, a laser cutting process can be performed to remove a part of pixel electrode 120 to electrically isolate a contact region C1 over the upper electrode E1 from the remaining portion of the pixel electrode 120. After the foregoing laser cutting process, a laser welding process may be further performed to weld the upper electrode E1, the contact region C1 over the upper electrode E1 and the bottom electrode 130 for forming a storage capacitor Cst3 comprising the contact region C1 over the upper electrode E1, the second dielectric layer 150 and the upper electrode E1.

In summary, the pixel structure of the present invention has at least the following advantages:
The pixel structure of the present invention is easy to be repaired, and is not likely to cause a slight bright dot defect after being repaired; and
The pixel structure of the present invention is adapted for being repaired under different defect conditions, including: short circuit between an upper electrode and the bottom electrode; short circuit of an upper electrode with the bottom electrode and the pixel electrode at the same time; short circuit between an upper electrode and a data line; and short circuit caused by a conductor residue.

It should be noted that specific embodiments of, and examples for, the invention are described herein for illustrative purposes, various equivalent modifications are possible within the scope of the invention, as those skilled in the relevant art will recognize that modifications and adaptations of the above-described preferred embodiments of the present invention may be made to meet particular requirements. This disclosure is intended to exemplify the invention without limiting its scope. All modifications that incorporate the invention disclosed in the preferred embodiment are to be construed as coming within the scope of the appended claims or the range of equivalents to which the claims are entitled.

What is claimed is:

1. A repairing method for repairing a pixel structure electrically connected to a scan line and a data line, the pixel structure comprising:
    an active device;
    a pixel electrode, electrically connected to the active device, having a plurality of gaps and a plurality of slits therein, wherein the gaps are integrated with the slits;
    a bottom electrode, disposed under the pixel electrode;
    a plurality of upper electrodes, disposed between the pixel electrode and the bottom electrode and only connected to the pixel electrode, the pixel electrode connecting the active device and the upper electrodes, wherein each of the upper electrodes comprises a contact region and a reserved region, and each of the gaps is located between the corresponding contact region and the corresponding reserved region of one of the upper electrodes;
    a first dielectric layer, disposed at least between the bottom electrode and the upper electrodes; and
    a second dielectric layer, disposed at least between the upper electrodes and the pixel electrode, the second dielectric layer and having a plurality of contact windows for exposing the corresponding upper electrodes in the contact region correspondingly and having no contact window in the reserve region, wherein each of the upper electrodes is only connected to the pixel electrode via the corresponding contact window in the contact region correspondingly;
    wherein each of the gaps of the pixel electrode is located above the second dielectric layer and between the contact region and the reserved region of one of the upper electrodes correspondingly, and
    when a short circuit occurs between one of the upper electrodes and the bottom electrode, the repairing method comprising:
    removing a portion of the pixel electrode to electrically isolate the contact region over the upper electrode from the remaining portion of the pixel electrode, wherein a storage capacitor is formed by the reserved region of the upper electrode, the second dielectric layer and the remaining portion of the pixel electrode.

2. The repairing method according to claim 1, further comprising:
    welding the upper electrode, the contact region over the upper electrode and the bottom electrode.

3. A repairing method for repairing a pixel structure electrically connected to a scan line and a data line, the pixel structure comprising:
    an active device;
    a pixel electrode, electrically connected to the active device, having a plurality of gaps and a plurality of slits therein, wherein the gaps are integrated with the slits;
    a bottom electrode, disposed under the pixel electrode;
    a plurality of upper electrodes, disposed between the pixel electrode and the bottom electrode and only connected to the pixel electrode, the pixel electrode connecting the active device and the upper electrodes, wherein each of the upper electrodes comprises a contact region and a reserved region, and each of the gaps is located between the corresponding contact region and the corresponding reserved region of one of the upper electrodes;

a first dielectric layer, disposed at least between the bottom electrode and the upper electrodes; and a second dielectric layer, disposed at least between the upper electrodes and the pixel electrode, the second dielectric layer and having a plurality of contact windows for exposing the corresponding upper electrodes in the contact region correspondingly and having no contact window in the reserve region, wherein each of the upper electrodes is only connected to the pixel electrode via the corresponding contact window in the contact region correspondingly;

wherein each of the gaps of the pixel electrode is located above the second dielectric layer and between the contact region and the reserved region of one of the upper electrodes correspondingly, and when the a short circuit occurs between the bottom electrode and the pixel electrode or between one of the upper electrodes and the pixel electrode, the repairing method comprising:

removing a portion of the pixel electrode to electrically isolate the contact region over the upper electrode, the reserved region over the upper electrode and the reserved region over another one of the upper electrodes from the remaining portion of the pixel electrode, wherein a storage capacitor is formed by the reserved region of the another one of the upper electrodes, the second dielectric layer and the remaining portion the pixel electrode.

4. The repairing method according to claim 3, further comprising:

welding the upper electrode, the reserved region over the upper electrode and the bottom electrode.

5. A repairing method for repairing a pixel structure electrically connected to a scan line and a data line, the pixel structure comprising:

an active device;

a pixel electrode, electrically connected to the active device, having a plurality of gaps and a plurality of slits therein, wherein the gaps are integrated with the slits;

a bottom electrode, disposed under the pixel electrode;

a plurality of upper electrodes, disposed between the pixel electrode and the bottom electrode and only connected to the pixel electrode, the pixel electrode connecting the active device and the upper electrodes, wherein each of the upper electrodes comprises a contact region and a reserved region, and each of the gaps is located between the corresponding contact region and the corresponding reserved region of one of the upper electrodes;

a first dielectric layer, disposed at least between the bottom electrode and the upper electrodes; and a second dielectric layer, disposed at least between the upper electrodes and the pixel electrode, the second dielectric layer and having a plurality of contact windows for exposing the corresponding upper electrodes in the contact region correspondingly and having no contact window in the reserve region, wherein each of the upper electrodes is only connected to the pixel electrode via the corresponding contact window in the contact region correspondingly;

wherein each of the gaps of the pixel electrode is located above the second dielectric layer and between the contact region and the reserved region of one of the upper electrodes correspondingly, and when the a short circuit occurs between one of the upper electrodes and the data line, the repairing method comprising:

removing a portion of the pixel electrode to electrically isolate the contact region over the upper electrode, the reserved region over the upper electrode and the reserved region over another one of the upper electrodes from the remaining portion of the pixel electrode; and welding the portion of the pixel electrode with the bottom electrode, wherein a storage capacitor is formed by the reserved region of the another one of the upper electrodes, the second dielectric layer and the remaining portion the pixel electrode.

6. A repairing method for repairing a pixel structure electrically connected to a scan line and a data line, the pixel structure comprising:

an active device;

a pixel electrode, electrically connected to the active device, having a plurality of gaps and a plurality of slits therein, wherein the gaps are integrated with the slits;

a bottom electrode, disposed under the pixel electrode;

a plurality of upper electrodes, disposed between the pixel electrode and the bottom electrode and only connected to the pixel electrode, the pixel electrode connecting the active device and the upper electrodes, wherein each of the upper electrodes comprises a contact region and a reserved region, and each of the gaps is located between the corresponding contact region and the corresponding reserved region of one of the upper electrodes;

a first dielectric layer, disposed at least between the bottom electrode and the upper electrodes; and a second dielectric layer, disposed at least between the upper electrodes and the pixel electrode, the second dielectric layer and having a plurality of contact windows for exposing the corresponding upper electrodes in the contact region correspondingly and having no contact window in the reserve region, wherein each of the upper electrodes is only connected to the pixel electrode via the corresponding contact window in the contact region correspondingly;

wherein each of the gaps of the pixel electrode is located above the second dielectric layer and between the contact region and the reserved region of one of the upper electrodes correspondingly, and when the a short circuit occurs between one of the upper electrodes and another one of upper electrodes of an adjacent pixel structure due to conductor residue, the repairing method comprising:

removing a portion of the pixel electrode to electrically isolate the contact region over the upper electrode from the remaining portion of the pixel electrode; and welding the portion of the pixel electrode, the contact region over the upper electrode with the bottom electrode, wherein a storage capacitor is formed by the reserved region of the upper electrode, the second dielectric layer and the remaining portion the pixel electrode.

* * * * *